(12) United States Patent
Kamiya et al.

(10) Patent No.: US 6,454,073 B2
(45) Date of Patent: Sep. 24, 2002

(54) APPARATUS FOR HYDRAULICALLY OPERATING CLUTCH

(75) Inventors: Tadashi Kamiya, Tochigi-ken (JP); Hideo Udou, Tochigi-ken (JP); Shinji Fujimoto, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 70 days.

(21) Appl. No.: 09/730,589

(22) Filed: Dec. 7, 2000

(30) Foreign Application Priority Data

Feb. 7, 2000 (JP) ........................................ 2000-029347

(51) Int. Cl.[7] ............................................. F16D 25/08
(52) U.S. Cl. ................................. 192/85 R; 192/109 F; 60/591
(58) Field of Search ............................ 192/85 C, 85 R, 192/109 F, 85 CA; 60/591, 584

(56) References Cited

U.S. PATENT DOCUMENTS

| | | | | |
|---|---|---|---|---|
| 5,307,727 A | * | 5/1994 | Berger et al. ............... | 192/3.33 |
| 5,718,316 A | * | 2/1998 | Gee ........................ | 192/109 D |
| 5,823,313 A | * | 10/1998 | Bohner et al. ............ | 192/109 F |
| 6,033,341 A | * | 3/2000 | Yamamoto et al. ......... | 477/181 |

FOREIGN PATENT DOCUMENTS

| | | | |
|---|---|---|---|
| DE | 4304248 A1 | * | 8/1994 |
| GB | 2264546 A | * | 1/1993 |
| JP | 62-83518 | | 4/1987 |

* cited by examiner

*Primary Examiner*—Saul Rodriguez
(74) *Attorney, Agent, or Firm*—Armstrong, Westerman & Hattori, LLP

(57) ABSTRACT

A flow limiting device provided between a clutch master cylinder and a clutch operating cylinder has a first fluid chamber on one axial side in communication with the clutch master cylinder, a second fluid chamber on the axially opposite side in communication with the clutch operating cylinder, and a piston for partitioning the first and second fluid chambers. The piston has on a circumference thereof an annular groove in communication with the second fluid chamber through an inner passage, and a land on the axially opposite side of the annular groove. As passages to communicate the second fluid chamber and the clutch operating cylinder, there are provided a first passage opening into the cylinder portion in a position away in the axially opposite side relative to the land when the piston is in one stroke position at which the clutch is disengaged, and a second passage opening into the cylinder portion at a position coinciding with a position of the annular groove when the piston is in said one stroke position. When the piston is in an axially intermediate stroke position in which the clutch is in the clutch-slipping state, an opening of the second passage is closed by the land. In the first passage, there is interposed a one-way valve having an orifice which has an easy flow direction in a direction toward the clutch operating cylinder.

1 Claim, 2 Drawing Sheets

APPARATUS FOR HYDRAULICALLY OPERATING CLUTCH

BACKGROUND OF THE INVENTION

1. Field of the Invention

The present invention relates to an apparatus for hydraulically operating a clutch which is assembled or is contained in a manual transmission for a vehicle such as a motor vehicle, or the like.

2. Description of Related Art

This kind of conventional apparatus for hydraulically operating a clutch is provided with: a clutch master cylinder which generates a hydraulic pressure depending on the operation (i.e., the depression) of a clutch pedal which is defined as a clutch operating member; and a clutch operating cylinder which operates the clutch as a result of transmission of a hydraulic pressure from the clutch master cylinder. Further, Published Unexamined Japanese Patent Application No. 83518/1987 discloses an apparatus in which a flow limiting (or a flow restricting) device is interposed between the clutch master cylinder and the clutch operating cylinder. In this apparatus, in switching the clutch from a disengaged state to an engaged state, the flow amount of the operating fluid to be pushed out of the clutch operating cylinder is reduced at a point when the clutch attains a clutch-slipping state (or condition). It is thus so arranged that, even if the driver of the vehicle rapidly releases the depression of the clutch pedal, the clutch will not be suddenly engaged.

The above-described flow limiting device has a cylinder portion which comprises: a first fluid chamber on one axial side in communication with the clutch master cylinder; a second fluid chamber on the axially opposite side in communication with the clutch operating cylinder; and a piston for partitioning the first and the second fluid chambers. In that passage inside the flow limiting device which communicates from the first fluid chamber to the clutch master cylinder, there is interposed a throttle valve. The throttle valve has a valve body with a valve stem which projects through a guide hole formed in a peripheral wall of the cylinder portion so that the valve stem comes into contact with a peripheral surface of the piston. In this arrangement, the area of passage or flow is limited or restricted by the movement of the valve body in a direction in which the valve stem extends. When the piston has moved to a position in which the clutch attains the clutch-slipping state, the valve stem faces a recessed groove which is formed in the periphery of the piston. The valve body is then moved by the urging force of a spring in a direction in which the valve stem is inserted into the recessed groove, i.e., in the direction in which the valve stem extends. In this arrangement, in a position in which the clutch attains the clutch-slipping state, the area of the passage is throttled to thereby restrict the movement of the piston toward the first fluid chamber. The flow amount of the operating fluid to be pushed out of the clutch operating cylinder is thereby reduced.

In the above-described flow limiting device, there is employed a throttle valve which mechanically moves depending on the position of the piston. Therefore, it is likely to be influenced by the viscosity of the operating fluid due to the change in temperature. In other words, when the operating fluid is low in temperature and is therefore high in viscosity, even if the valve stem faces the recessed groove of the piston, the valve body will not move with a good response in the direction in which the valve stem extends. This is due to the fact that the valve body receives the viscous resistance of the operating fluid. As a result, the piston will sometimes move in a state in which the valve stem has not sufficiently been inserted into the recessed groove. In addition, the valve stem will sometimes be subjected to gouging or scratching inside the guide hole. In any of the above cases, sufficient throttling characteristics cannot be obtained in the clutch-slipping state. In addition, since the valve stem slides along the periphery of the piston while receiving an urging force of the valve spring, the top end of the valve stem wears away or is gouged (or scratched). Consequently, the throttling amount of the passage varies, and the wear may give rise to mechanical troubles.

In view of the above points, the present invention has an object of providing an apparatus for hydraulically operating a clutch which has the following feature, without using an interlocking member such as a throttle valve which mechanically moves depending on the position of the piston as is the case with the above-described conventional apparatus. The feature is that the returning of the clutch to the engaged state can be delayed in the clutch-slipping state, whereby the apparatus can be operated surely and the durability of the apparatus is also improved.

SUMMARY OF THE INVENTION

In order to attain the above and other objects, the present invention is an apparatus for hydraulically operating a clutch comprising: a clutch master cylinder for generating a hydraulic pressure by depressing a clutch operating member; a clutch operating cylinder for switching the clutch from an engaged state to a disengaged state by a hydraulic pressure transmitted from the clutch master cylinder; a flow limiting device disposed between the clutch master cylinder and the clutch operating cylinder such that, in switching the clutch from the disengaged state to the engaged state by releasing the depression of the clutch operating member, a flow amount of an operating fluid to be pushed out of the clutch operating cylinder is reduced when the clutch attains a clutch-slipping state, the flow limiting device having a cylinder portion which comprises: a first fluid chamber on one axial side in communication with the clutch master cylinder; a second fluid chamber on an axially opposite side in communication. with the clutch operating cylinder; and a piston for partitioning the first and second fluid chambers, characterized in: that the piston has on a circumference thereof: an annular groove in communication with the second fluid chamber through a passage inside the piston; and a land on the axially opposite side of the annular groove; that a first passage and a second passage are provided as passages to communicate the second fluid chamber and the clutch operating cylinder, the first passage opening into the cylinder portion in a position away in the axially opposite side relative to the land when the piston is in one stroke position at which the clutch is disengaged, the second passage opening into the cylinder portion at a position coinciding with a position of the annular groove when the piston is in said one stroke position, such that, in an axially intermediate stroke position of the piston at which the clutch attains the clutch-slipping state, an opening of the second passage is closed by the land; and that the first passage has interposed therein a one-way valve having an orifice, the one-way valve having an easy flow direction in a direction toward the clutch operating cylinder.

According to the present invention, at the time of switching the clutch from the disengaged state to the engaged state, the communication between the second fluid chamber and the second passage is shut off by the land of the piston when the clutch has attained the clutch-slipping state. The clutch operating cylinder is thus communicated with the second fluid chamber only through the first passage. Here, since the flow of the operating fluid in the first passage becomes a counterflow relative to the one-way valve, the operating fluid that is forced out of the clutch operating cylinder is returned to the second fluid chamber only through the orifice of the one-way valve. The flow amount of the operating fluid to be pushed out of the clutch operating cylinder is thus reduced. In this arrangement, the one-way valve is not an interlocking member which mechanically moves depending on the position of the piston. Therefore, a sufficient throttling characteristics can be obtained at the clutch-slipping state even if the viscosity of the operating fluid is high at a low temperature. In addition, the flow amount will not change with the lapse of time. Therefore, the apparatus can be operated surely with a smaller possibility of failure and with an improved durability. Still furthermore, since that land of the piston which closes the second passage slides along an inner surface of the cylinder which is free from projections and recessions, the surface of contact will not be subject to gouging or scratching operation. This also secures a construction which is free from mechanical troubles.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
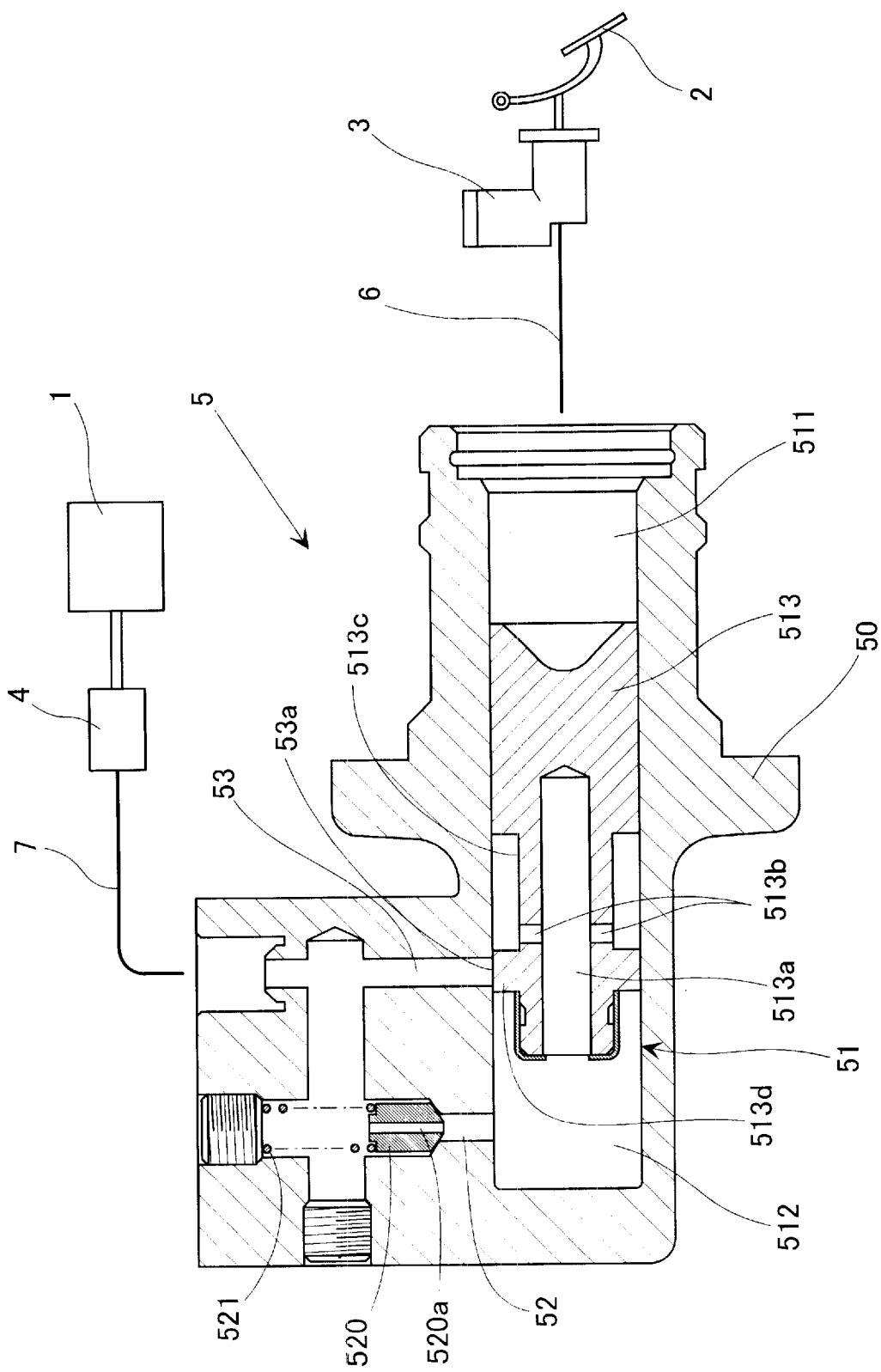
FIG. 1 is a circuit diagram showing one example of the apparatus for hydraulically operating a clutch according to the present invention.

FIG. 1 shows an apparatus for hydraulically operating a clutch 1 which is assembled, or built, in a manual transmission for a motor vehicle. The apparatus switches the clutch 1 from an engaged state to a disengaged state by the operation of depressing a clutch pedal 2 which is defined as a clutch operating member. This apparatus for hydraulically operating the clutch 1 has a clutch master cylinder 3 which generates a hydraulic pressure depending on the degree of depression of the clutch pedal 2, and a clutch operating cylinder 4 which s witches the clutch 1 from the engaged state to the disengaged state as a result of transmission of the hydraulic pressure from the clutch master cylinder 3. Between the clutch master cylinder 3 and the clutch operating cylinder 4, there is interposed a flow limiting device (or a flow restricting device) 5. When a driver of the motor vehicle releases the depression of the clutch pedal 2 to thereby switch the clutch 1 from the disengaged state to the engaged state, this flow limiting device 5 reduces the flow amount of the operating fluid to be pushed out of the clutch operating cylinder 4.

A housing 50 of the flow limiting device 5 is provided with a cylinder portion 51. The cylinder portion 51 is made up of a first fluid chamber 511 and a second fluid chamber 512. The first fluid chamber 511 lies on one axial side of the housing 50, and one end of a pipe 6 is connected to the first fluid chamber 511, the other end of the pipe 6 being connected to the clutch master cylinder 3. The second fluid chamber 512 lies on the axially opposite side of the housing 50 and is in communication with passages which are communicated with one end of a pipe 7 whose the other end is connected to the clutch operating cylinder 4. The passages are described in more detail hereinafter. The first fluid chamber 511 and the second fluid chamber 512 are partitioned by a piston 513. The piston 513 is provided: in an inside thereof, with an inner passage 513a which opens only into the second fluid chamber 512; on a periphery thereof, with an annular groove 513c which is communicated with the inner passage 513a through a plurality of throughgoing holes 513b; and a land 513d which partitions the annular groove 513c and the second fluid chamber 512.

The housing 50 is provided with a first passage 52 and a second passage 53 as passages to communicate the second fluid chamber 512 with the pipe 7 which is connected to the clutch operating cylinder 4. The first passage 52 is formed so as to open into the cylinder portion 51 in a position away toward the left of the position of the land 513d when the piston 513 is in an axially opposite stroke position (left side in FIG. 1) in which the clutch 1 is in a completely disengaged state. In addition, in the first passage 52, there is interposed a one-way valve 520 which opens against an urging force of a spring 521 when the operating fluid flows in a direction of easy flow. This direction of easy flow is defined as a direction in which the operating fluid flows from the second fluid chamber 512 to the clutch operating cylinder 4. This one-way valve 520 has formed therein an orifice 520a which constantly communicates the second fluid chamber 512 with the clutch operating cylinder 4. The second passage 53 is formed so as to open into the cylinder portion 51 in a position coinciding with the position of the annular groove 513c when the piston 513 is in the above-described left stroke position. When the piston 513 is in an axially intermediate stroke position in which the clutch 1 attains a clutch-slipping state, an opening 53a of the second passage 53 is closed by the land 513d. When the piston 513 is in a stroke position in one axial side (right side in FIG. 1), the second passage 53 is in direct communication with the second fluid chamber 512. Both the first passage 52 and the second passage 53 are merged into one for further connection to the pipe 7 which is in communication with the clutch operating cylinder 4.

Figure 2A:
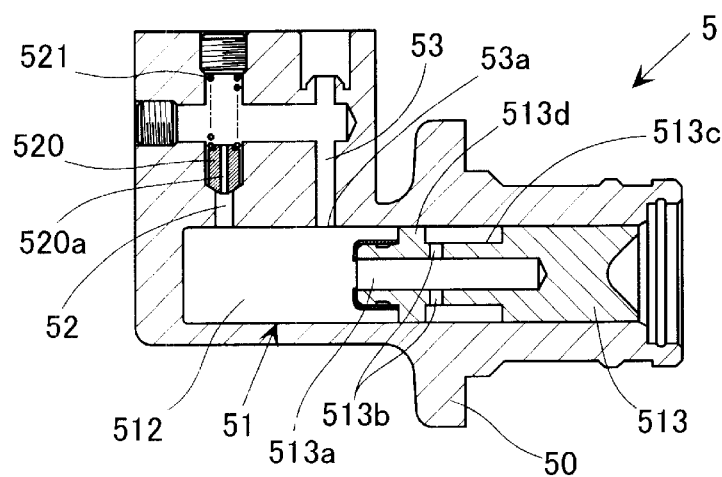
FIG. 2A is a cross-sectional view of a flow limiting device at the time of clutch connection.
Figure 2B:
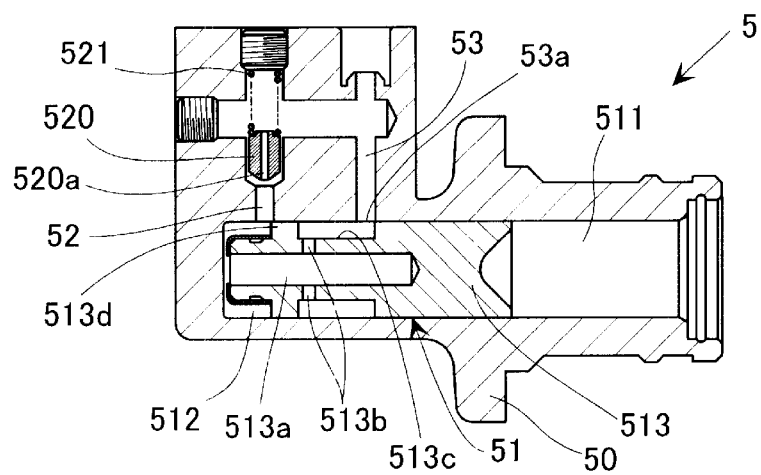
FIG. 2B is a cross-sectional view of the flow limiting device at the time of clutch-slipping.
Figure 2C:
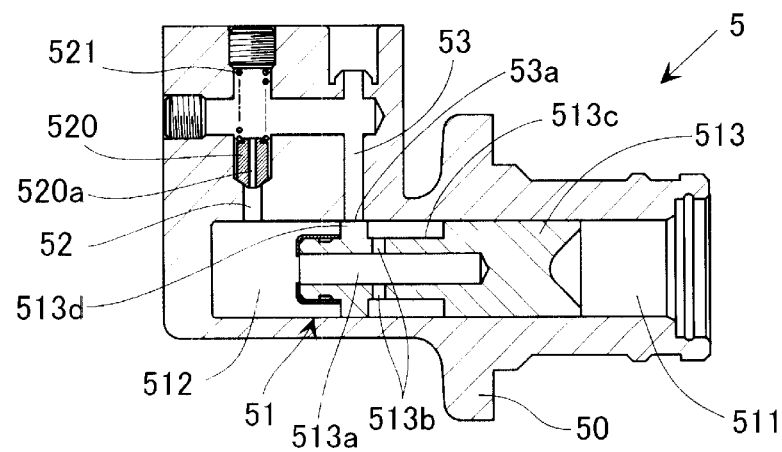
FIG. 2C is a cross-sectional view of the flow limiting device at the time of clutch disengagement.

With reference to FIGS. 2A–2C, an explanation will now be made about the operation of the above-described flow limiting device 5.

FIG. 2A is a cross-sectional view of the flow limiting device 5 when the clutch 1 is in the engaged state. In this state, the piston 513 is in a right stroke position. In other words, the volume of the first fluid chamber 511 is nearly zero, and the second fluid chamber 512 is filled with the operating fluid.

When the driver of the motor vehicle depresses the clutch pedal 2 in this state in order to switch the clutch 1 from the engaged state to the disengaged state, the clutch master cylinder 3 generates a hydraulic pressure. By this hydraulic pressure, the piston 513 slides to the axially left side. The operating fluid in the second fluid chamber 512 thus flows into the first and the second passages 52, 53 and also the one-way valve 520 in the first passage 52 is opened. In this manner, the operating fluid is supplied from the second fluid chamber 512 to the clutch operating cylinder 4. In other words, the hydraulic pressure from the clutch master cylinder 3 is transmitted to the clutch operating cylinder 4. The clutch 1 is thereby switched to the disengaged state against the urging force of a return spring (not illustrated) which is built in the clutch 1. At that time, the piston 513 reaches the stroke position as shown in FIG. 2B. Here, the land 513d of the piston 513 once closes the second passage 53 on the way of movement of the piston 513. However, since the one-way valve 520 which is interposed in the first passage 52 has been opened, the flow amount of the operating fluid to be supplied to the clutch operating cylinder 4 will not be reduced to a large degree.

When the driver releases the depression of the clutch pedal 2 in order to switch the clutch 1 from the state as shown in FIG. 2B to the engaged state, the operating fluid will be pushed out of the clutch operating cylinder 4 by the urging force of the return spring of the clutch 1. The operating fluid thus flows backward in the pipe 7 as well as in the first and second passages 52, 53 to the second fluid chamber 512. In this case, the one-way valve 520 in the first passage 52 is closed by the urging force of the spring 521 whereby, at the one-way valve 520, the operating fluid thus flows backward into the second fluid chamber 512 only through the orifice 520a. However, the second passage 53 is in communication with the second fluid chamber 512 through the annular groove 513c of the piston 53 as well as through the inner passage 513b. Therefore, at the beginning, the flow amount of the operating fluid to be pushed out of the clutch operating cylinder 4 is not limited or restricted, and the return speed of the clutch operating cylinder 4 is therefore high.

However, once the piston 513 reaches the axially intermediate stroke position as shown in FIG. 2C which corresponds to the clutch-slipping state, the second passage 53 is closed by the land 513d of the piston 513. Therefore, the operating fluid flows only through the orifice 520a in the one-way valve 520 which is interposed in the first passage 52. The flow amount of the operating fluid to be pushed out of the clutch operating cylinder 4 is thereby reduced. As a result, the return speed of the clutch operating cylinder 4 becomes small, whereby the clutch 1 is prevented from being engaged suddenly. Here, the one-way valve 520 is not an interlocking member which mechanically moves depending on the position of the piston 513. Therefore, even if the viscosity of the operating fluid is high, sufficient throttling characteristics can be obtained in the clutch-slipping state. In this manner, there can be attained a construction which is hardly subject to a wrong operation or a failure in operation.

Once the land 513d of the piston 513 passes over the position of the opening 53a of the second passage 53, the second passage 53 is again opened to passage (or opened to flow of the operating fluid). The flow amount of the operating fluid to be pushed out of the clutch operating cylinder 4 increases again. The piston 513 thus returns to the axially right stroke position as shown in FIG. 2A. The clutch 1 can thus be switched from the clutch-slipping state to the engaged state at a good response.

It is readily apparent that the above-described apparatus for hydraulically operating a clutch meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for hydraulically operating a clutch comprising:

a clutch master cylinder for generating a pressure by depressing a clutch operating member;

a clutch operating cylinder for switching said clutch from an engaged state to a disengaged state by a hydraulic pressure transmitted from said clutch master cylinder;

a flow limiting device disposed between said clutch master cylinder and said clutch operating cylinder such that, in switching said clutch from the disengaged state to the engaged state by releasing the depression of said clutch operating member, a flow amount of an operating fluid to be pushed out of said clutch operating cylinder is reduced when said clutch attains a clutch-slipping state, said flow limiting device having a cylinder portion which comprises: a first fluid chamber on one axial side in communication with said clutch master cylinder; a second fluid chamber on an axially opposite side in communication with said clutch operating cylinder; and a piston for partitioning said first and second fluid chambers, characterized in:

that said piston has on a circumference thereof: an annular groove in communication with said second fluid chamber through a passage inside said piston; and a land on the axially opposite side of said annular groove;

that a first passage and a second passage are provided as passages to communicate said second fluid chamber and said clutch operating cylinder, said first passage opening into said cylinder portion in a position away in the axially opposite side relative to said land when said piston is in one stroke position at which said clutch is disengaged, said second passage opening into said cylinder portion at a position coinciding with a position of said annular groove when said piston is in said one stroke position, such that, in an axially intermediate stroke position of said piston at which said clutch attains the clutch-slipping state, an opening of said second passage is closed by said land; and that said first passage has interposed therein a one-way valve having an orifice, said one way valve having an easy flow direction in a direction toward said clutch operating cylinder.

* * * * *